Sept. 6, 1932.   R. F. KOHR   1,875,468
BRAKE
Filed Jan. 30, 1931
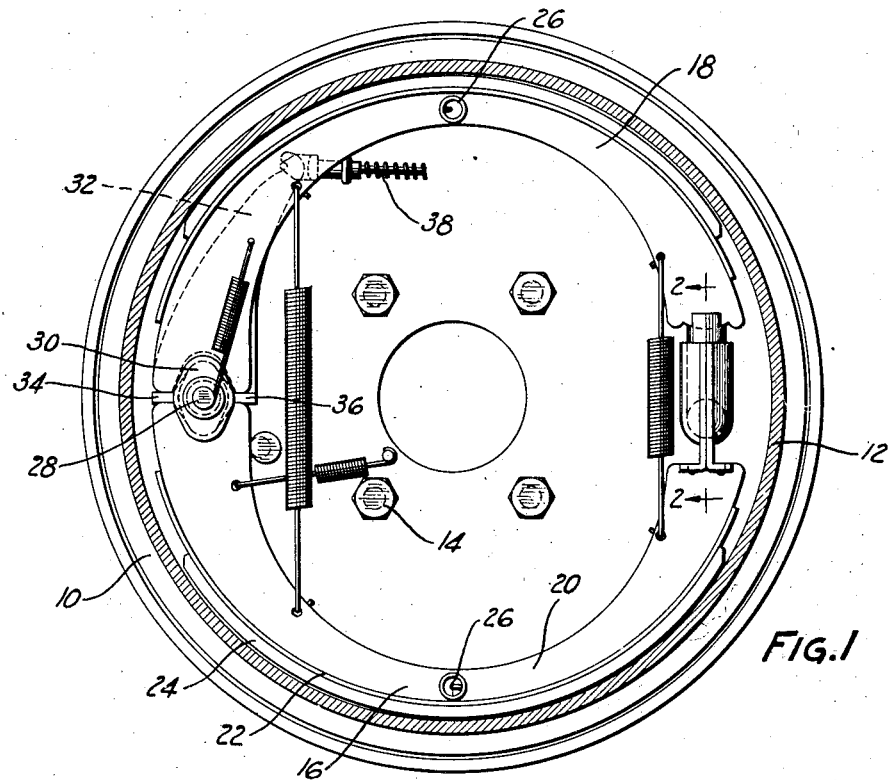
FIG.1
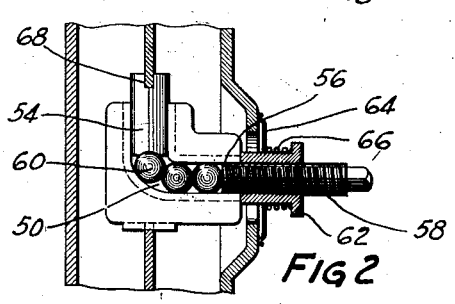
FIG.2
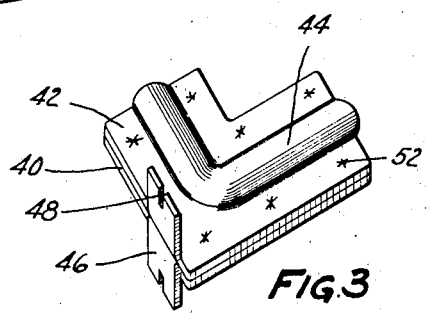
FIG.3
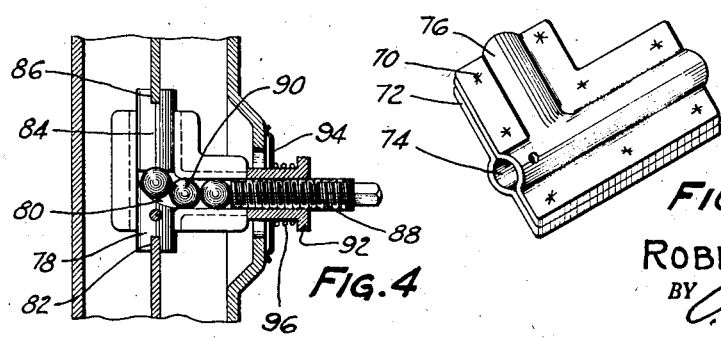
FIG.4
FIG.5
INVENTOR.
ROBERT F. KOHR
BY *O. H. Fowler*
ATTORNEY Patented Sept. 6, 1932

1,875,468

UNITED STATES PATENT OFFICE

ROBERT F. KOHR, OF SOUTH BEND, INDIANA, ASSIGNOR TO BENDIX BRAKE COMPANY, OF SOUTH BEND, INDIANA, A CORPORATION OF ILLINOIS

BRAKE

Application filed January 30, 1931. Serial No. 512,320.

This invention relates to brakes and more particularly to internal expanding brakes.

Heretofore, in the manufacture of brakes for motor vehicles, various devices have been utilized for adjustably connecting the articulated ends of the friction elements. Many of these devices have proved eminently satisfactory. They have, however, generally added materially to the cost of production owing to the number of parts in the assembly and in many instances the required or necessary amount of machine work on the parts.

The present invention aims to provide an adjustable connection for the articulated ends of friction elements comprising but few parts which may be easily and quickly assembled.

An object of the invention is to provide a simple and inexpensive adjustable connection for the articulated ends of friction elements which may be easily and quickly assembled, is highly efficient in use, positive in action, durable in service and a general improvement in the art.

Another object of the invention is to provide an adjusting connection for the articulated ends of a friction element having but few parts on which the amount of required machine operation during manufacture may be materially reduced.

Other objects of the invention will appear from the following description taken in connection with the drawing, which forms a part of this specification, and in which:

Figure 1 is a vertical sectional view taken just back of the drum illustrating the invention as applied;

Figure 2 is a section substantially on line 2—2, Figure 1;

Figure 3 is a perspective view of the body of the device;

Figure 4 is a sectional view illustrating a modified form of the invention; and

Figure 5 is a perspective view of the body of the modified form of the device.

Referring to the drawing for more specific details of the invention, 10 represents a fixed support such as a backing plate. The backing plate has associated therewith a rotatable drum 12 which may be secured to a wheel as by bolts 14. Positioned for movement on the backing plate is a primary shoe 16 and a secondary shoe 18. As shown, these shoes are of a semi-flexible type each comprising a web 20 of varying cross section supporting a rim 22 to which is suitably secured a lining 24 adaptable for co-operation with the braking surface of the drum. The shoes are supported on the backing plate by suitable steady rests 26 and are connected at their articulated ends by an adjusting device to be hereinafter more fully described.

Positioned on the backing plate between the separable ends of the primary and secondary shoes is a fixed anchor 28 having secured thereto a plate 30 adapted to restrain the shoes against lateral movement. This anchor also functions as a fulcrum for a floating lever 32 having cams 34 and 36 arranged to engage the separable ends of the primary and secondary shoes, and suitably connected to the lever is a tension member 38 through which force is applied to operate the brakes.

The adjusting device comprises two stampings 40 and 42 each having a groove 44 and a flange 46 provided with a notch 48. As shown, the groove is substantially angular with one leg of the angle longer than the other and the flange 46 is so positioned that the notch 48 therein is in a plane through the axis of that portion of the groove in the longer leg. These stampings are arranged back to back to provide a conduit 50 and are welded together as indicated at 52. Positioned for movement in one end of the conduit is a plunger 54 and the other end of the conduit is threaded as indicated at 56 to receive a thrust screw 58, and positioned in the conduit between the plunger 54 and the thrust screw 58 is a plurality of balls 60.

As shown, the thrust screw 58 extends through a suitable opening in the backing plate, and threaded on the thrust screw is an elongated lock nut 62 having positioned thereon a cover plate 64 urged against the backing plate by a spring 66 wound on the elongated lock nut 62 between the cover plate and the head of the nut.

The plunger 54 is provided with a slot 68 adaptable for the reception of the articulated end of one of the shoes, and the flanges 46 on the stampings 40 and 42 provide a suitable abutment for the articulated end of the other shoe, the notches 48 in these flanges serving to retain the shoe in engagement with the flanges.

A modification of the invention is illustrated in Figures 4 and 5. In this embodiment of the invention, two corresponding stampings 70 and 72 have formed therein grooves so arranged that when the stampings are positioned back to back, there is provided a member having a conduit 74 and a branch conduit 76. The conduit 74 has secured in one end thereof a plug 78, the inner end of which is cut away as indicated at 80. This plug has a notch 82 adaptable for the reception of the web on one of the shoes. The other end of the conduit 74 has positioned therein a movable plunger 84 provided with a slot adaptable for the reception of the web of the other shoe.

The branch conduit 76 is internally threaded to receive a thrust screw 88, and arranged in the conduits 74 and 76 between the plunger 84 and the thrust screw 88 are a series of balls 90. The screw 88 is provided with a lock nut 92 having positioned thereon a cover plate 94 urged against the backing plate by a spring 96.

While the preferred embodiments of the invention have been described, it is to be understood that these are given merely as examples of the underlying principles of the invention, and since these may be incorporated in other specific mechanical structures, I do not intend to be limited to those shown, except as such limitations are clearly imposed by the appended claims.

Having thus described the various features of the invention, what I claim as new and desire to secure by Letters Patent is:

1. An adjustable connection for the articulated ends of friction elements comprising two corresponding stampings arranged to provide an angular conduit having one leg longer than the other, flanges on the stampings having notches adapted to receive one of the friction elements, a plunger movable in the longer leg of the conduit having a notch adaptable for the reception of the other friction elements, a thrust screw positioned in the shorter leg of the conduit, a flexible connection between the thrust screw and plunger and a lock nut on the thrust screw.

2. A brake comprising articulated friction elements, means connecting the articulated ends of the friction elements and shiftable with said elements and including a member having a conduit, a movable plunger in one end of the conduit engaging one of the friction elements, a flange on the member having a notch for the reception of the other friction element, a thrust screw in the other end of the conduit, a flexible connection between the plunger and the thrust screw and means for locking the thrust screw in adjusted position.

3. A brake comprising a backing plate, friction elements on the backing plate, means connecting the articulated ends of the friction element comprising a member having an angular conduit, a plunger in one end of the conduit engaging one of the friction elements, means on the member engaging the other friction element, a screw threaded in the conduit extending through an opening in the backing plate, a plurality of balls arranged within the conduit between the plunger and the thrust screw, a lock nut on the thrust screw, a cover plate on the lock nut and means for urging the cover plate against the backing plate.

4. A brake comprising a backing plate, friction elements on the backing plate, a member having a conduit and a branch conduit, an abutment in one end of the conduit embracing one of the friction elements, a plunger in the other end of the conduit embracing the other friction element, a thrust screw in the branch conduit and a flexible connection between the movable plunger and the thrust screw.

5. A brake comprising a fixed support, friction elements thereon, a member having a conduit and a branch conduit, a fixed abutment in one end of the conduit embracing one of the friction elements, a movable plunger in the other end of the conduit embracing the other friction element, a screw threaded in the branch conduit and extending through an opening in the backing plate, a plurality of balls positioned in the conduits between the plunger and the screw, a lock nut on the screw and a spring pressed cover plate carried by the lock nut.

6. In a brake structure, the combination with a backing plate, a thrust screw extending through an opening in the backing plate, a lock nut on the thrust screw, a cover plate slidable on the lock nut and means for urging the cover plate against the backing plate.

7. In a brake structure, the combination with a backing plate having an opening and friction elements on the backing plate, a member for adjusting the friction elements including a thrust screw projecting through the opening in the backing plate, a lock nut on the thrust screw having an enlarged head, a cover plate movable on the lock nut and a spring on the nut between the cover plate and the head of the nut.

8. In a brake structure, the combination with a backing plate and friction elements on the backing plate, an adjusting member connecting the articulated ends of the friction elements, a thrust screw for operating the adjusting member extending through an opening in the backing plate, an elongated lock nut on the screw, a cover plate movable axially on the nut and adapted to cover the opening in the backing plate and a spring wound upon the nut between the cover plate and the head of the nut.

9. In a brake structure, the combination of a backing plate and friction elements positioned for movement thereon, a member connecting the articulated ends of the friction elements including an angular conduit, a plunger positioned in one end of the conduit embracing one of the friction elements, means on the member for engaging the other friction element, a thrust screw positioned in the other end of the conduit extending through an opening in the backing plate, flexible means between the plunger and the thrust screw, means for manipulating the thrust screw, a lock nut on the thrust screw adapted to seat against the member, a cover plate on the lock nut and means for urging the cover plate against the backing plate.

10. A brake comprising a pair of shoes, an anchorage and an applying device engaging the same adjacent ends of the shoes, and a floating joint connecting the opposite ends of the shoes and having a right-angled passage and a medium shiftable in said passage and around the angle thereof to force the shoe ends apart to adjust the brake for wear.

11. An expansion joint for a brake or the like comprising two stampings secured together face to face and formed with a main passage therethrough and with a branch passage, a pair of plungers in the opposite ends of said main passage and one of which is restrained from movement therein and is formed with its inner end curved, a series of balls in the main passage between the plungers and in the branch passage, and means for forcing the balls in the branch passage to be deflected by said curved end into the main passage.

12. An expansion joint for a brake or the like comprising two stampings secured together face to face and formed with a main passage therethrough and with a branch passage, a pair of plungers in the opposite ends of said main passage and one of which is formed with its inner end curved, a series of balls in the main passage between the plungers and in the branch passage, and means for forcing the balls in the branch passage to be deflected by said curved end into the main passage.

13. An expansion joint for a brake or the like formed with a main passage therethrough and with a branch passage, a pair of plungers in the opposite ends of said main passage and one of which is restrained from movement therein and is formed with its inner end curved, a series of balls in the main passage between the plungers and in the branch passage, and means for forcing the balls in the branch passage to be deflected by said curved end into the main passage.

14. An expansion joint for a brake or the like formed with a main passage therethrough and with a branch passage, a pair of plungers in the opposite ends of said main passage and one of which is formed with its inner end curved, a series of balls in the main passage between the plungers and in the branch passage, and means for forcing the balls in the branch passage to be deflected by said curved end into the main passage.

In testimony whereof, I have hereunto signed my name.

ROBERT F. KOHR.